(12) United States Patent
VanDemark et al.

(10) Patent No.: US 8,879,085 B2
(45) Date of Patent: Nov. 4, 2014

(54) AUTOMATIC PRINT FAILURE DETECTION AND CORRECTION

(75) Inventors: Michael J. VanDemark, Springboro, OH (US); Richard E. Brown, Dacula, GA (US)

(73) Assignee: NCR Corporation, Duluth, GA (US)

( * ) Notice: Subject to any disclaimer, the term of this patent is extended or adjusted under 35 U.S.C. 154(b) by 313 days.

(21) Appl. No.: 12/924,084

(22) Filed: Sep. 20, 2010

(65) Prior Publication Data

US 2012/0069378 A1  Mar. 22, 2012

(51) Int. Cl.
| G06F 15/00 | (2006.01) |
| B41J 2/32 | (2006.01) |
| B41J 3/60 | (2006.01) |
| B41J 2/36 | (2006.01) |
| G06K 1/12 | (2006.01) |
| B41J 29/393 | (2006.01) |
| G06K 5/02 | (2006.01) |

(52) U.S. Cl.
CPC .... B41J 3/60 (2013.01); B41J 2/32 (2013.01); B41J 2/36 (2013.01); G06K 1/121 (2013.01); B41J 29/393 (2013.01); G06K 5/02 (2013.01)
USPC .......... 358/1.14; 358/504; 358/1.15

(58) Field of Classification Search
None
See application file for complete search history.

(56) References Cited

U.S. PATENT DOCUMENTS

| 6,045,046 | A * | 4/2000 | Detwiler | 235/114 |
| 6,351,546 | B1 * | 2/2002 | Murayama et al. | 382/112 |
| 6,650,427 | B2 * | 11/2003 | Brooks et al. | 358/1.12 |
| 7,344,078 | B2 * | 3/2008 | Elliott et al. | 235/462.01 |
| 7,650,019 | B2 * | 1/2010 | Turke et al. | 382/112 |
| 2004/0057768 | A1 * | 3/2004 | Oshino et al. | 400/103 |
| 2004/0190016 | A1 * | 9/2004 | Gatto et al. | 358/1.6 |
| 2004/0199427 | A1 * | 10/2004 | van der Loo | 705/16 |
| 2005/0144562 | A1 * | 6/2005 | Schena et al. | 715/741 |
| 2005/0218225 | A1 * | 10/2005 | Johnson | 235/386 |
| 2006/0082822 | A1 * | 4/2006 | Irons et al. | 358/1.15 |
| 2006/0150851 | A1 * | 7/2006 | Bremond et al. | 101/484 |
| 2006/0274099 | A1 * | 12/2006 | Jahana et al. | 347/15 |
| 2007/0211099 | A1 * | 9/2007 | Lyons et al. | 347/16 |
| 2008/0079763 | A1 * | 4/2008 | Abrott | 347/19 |
| 2008/0121704 | A1 * | 5/2008 | Cummings | 235/386 |
| 2008/0151222 | A1 * | 6/2008 | Fujimoto et al. | 356/71 |
| 2009/0148002 | A1 * | 6/2009 | Spitzig | 382/112 |
| 2009/0290923 | A9 * | 11/2009 | Lyons et al. | 400/82 |
| 2010/0188671 | A1 * | 7/2010 | Ihme et al. | 358/1.9 |
| 2010/0188714 | A1 * | 7/2010 | Yamakawa | 358/504 |
| 2010/0225725 | A1 * | 9/2010 | Roth | 347/107 |

* cited by examiner

Primary Examiner — Vincent Rudolph
Assistant Examiner — Helen Q Zong
(74) Attorney, Agent, or Firm — Joseph P. Merhle

(57) ABSTRACT

Automatic print failure detection and correction are presented. An image is produced on media as it passes through a printer, the image produced by a first print head of the printer. The image is then inspected as it appears on the media for a predefined quality level. When the quality level is unacceptable, remote network notifications can be sent from the printer for proactive maintenance to be performed on the printer. In addition, when the quality level is unacceptable, a copy of the image can be automatically reproduced on an opposite side of the media using a different print head of the printer.

20 Claims, 4 Drawing Sheets

AUTOMATIC PRINT FAILURE DETECTION AND CORRECTION

BACKGROUND

Thermal printing has always held the downside of the fact that print head deterioration as well as poor thermal paper quality can result in poor print quality, which can lead to a number of downstream issues and problems. These problems include the failure to be able to read the intended printed information, which can often include bar codes that are read by scanners as part of the process. Failure of these bar codes or other information to print correctly and, as a result be non readable disrupts the intended process flow and results in potentially significant disruptions, requiring intensive actions to resolve.

The situation is often made worse as many thermal printing operations are unmanned allowing for the problem to persist for an extended period of time before being identified and only after process interruptions have occurred. This magnifies the seriousness of the problem created and increases the required effort to correct.

The identified problems, associated with printing bar codes and other critical information, are not limited to thermal printers. That is, ink jet printers, impact printers, and laser printers also have similar issues, which are: unmanned printing stations can malfunction for an extended period of time before the problems are detected and corrected; such situations are costly to enterprises.

SUMMARY

In various embodiments, techniques for automatic print failure detection and correction are presented. According to an embodiment, a printer is presented. The printer includes a print head and a capture device. The capture device is situated within the printer for purposes of electronically capturing and recording the version of the image, which is obtained from the first side of the media. The capture device is also configured for verifying that a quality level of the version is within a predefined tolerance; the version is electronically captured and verified before the media is dispensed from the printer with the version of the image appearing on the first side of the media.

DETAILED DESCRIPTION

FIGS. 1A-1D are diagrams of different imaged information occurring in different configurations on print media. The FIGS. 1A-1D are shown for purposes of illustration only. Different configurations are achievable with the teachings presented herein. Moreover, different print failure situations can be detected beyond that which is depicted in the example illustrations of the FIGS. 1A-1D.

The FIGS. 1A-1D provide a visual context that is useful in describing various aspects of the embodiments presented herein.

Figure 1A:
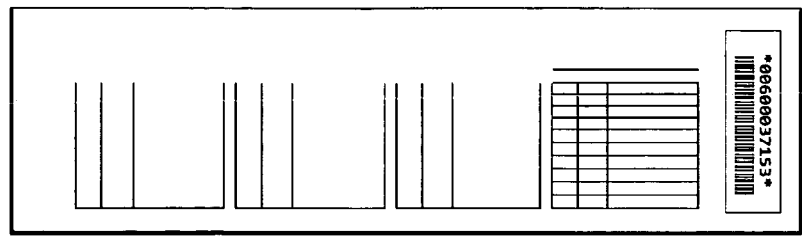
FIGS. 1A-1D are diagrams of different imaged information occurring in different configurations on print media.

For example, the FIG. 1A depicts a bar code that is printed on a first side of media. It is noted that the bar code is information that is of importance to a consumer and enterprise. The bar code uniquely identifies a particular transaction of the consumer with the enterprise that occurred in some manner.

As used herein "image" refers to information, such as a bar code, unique image, unique pattern, a serial number, a pass code, etc. that a printer causes to be imaged to print media. The information uniquely identifies a particular transaction of a consumer with an enterprise. So, in this sense the bar code of the FIG. 1A is but one example of the type of unique identifying images that a printer can cause to be imaged to print media for purposes of the teachings presented herein and below.

The printer is enhanced, as discussed in greater detail below, to provide automatic failure detection and correction capabilities. The enhanced printer can be thermal-based, inkjet-based, laser-based, and/or impact-based.

Figure 1B:
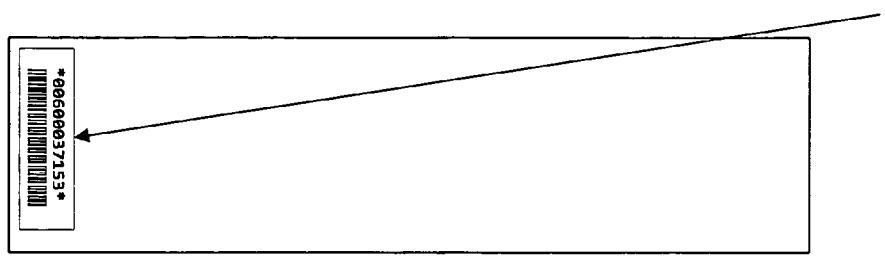

The FIG. 1B is intended to show an opposite side of the print media depicted in the FIG. 1A, with the bar code imaged a second time as a second version or copy of the version produced in the FIG. 1B. Essentially, the bar code is copied or duplicated on the opposite side of the media. As will be discussed in greater detail herein and below, the second print of the bar code occurs via a second and dual print head associated with the enhanced printer. So, a second print head reprints the bar code on an opposite side of the media.

This bar code or unique image that is reprinted on the second side of the print media (can be referred to as "media" herein and below) represents something that the consumer needs and therefore, the quality of the print on the first side of the media (the FIG. 1A) needs to be of a sufficient level that the consumer can use it. For example, the bar code may represent a ticket to an event that a bar code reader is going to have to scan before the consumer can enter the event. It may also be that the bar code is a boarding pass to an airplane, boat, train, etc. where a bar code reader will need to scan. Accordingly, the quality of the image appearing on the first side of the print media (the FIG. 1A barcode) needs to be of a sufficient level that it can be automatically read by scanners and/or visually read by the consumer.

Figure 1C:
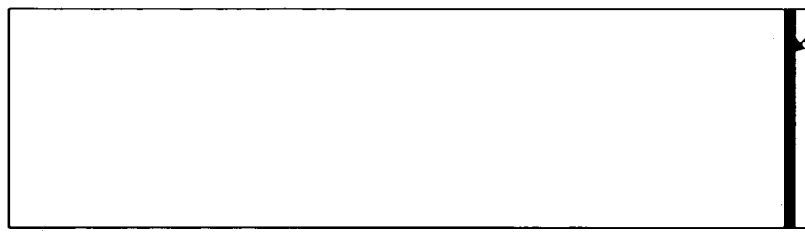
Figure 1D:
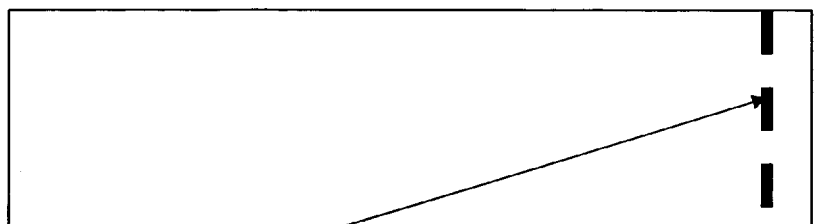

The FIG. 1C is intended to depict a solid bar code that shows no signs of image deterioration when it is printed to the first side of media. Conversely, the FIG. 1D is intended to depict a broken or poor quality bar code that is printed to the first side of media. The techniques described herein and below are intended to validate that the FIG. 1C scenario is acceptable and detect that the FIG. 1D is unacceptable before media is dispensed from a printer to a consumer.

It is also noted that, in some embodiments, the printer may be integrated into a kiosk that the consumer interacts with. The kiosk can be for a variety of purposes, such as purchasing goods, purchasing services, purchasing event tickets, and/or performing financial transactions.

It is within this context that various embodiments of the invention are now presented.

Figure 2:
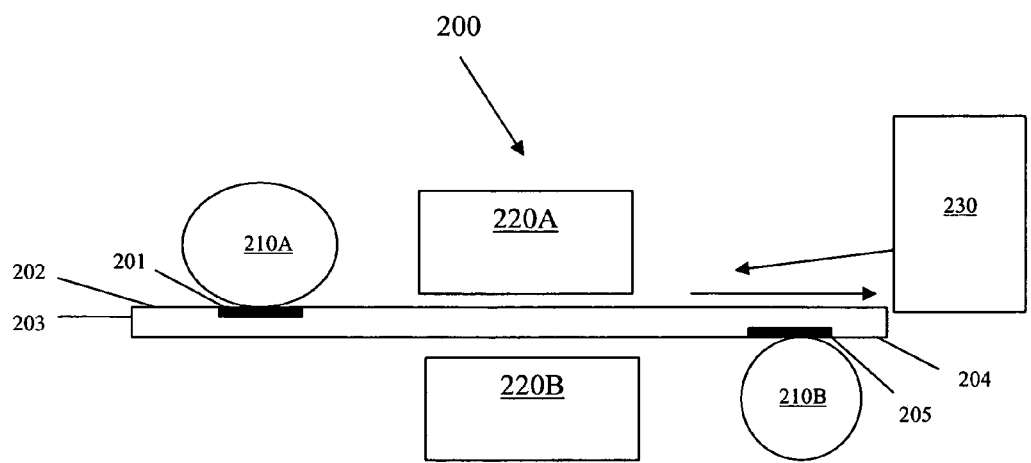
FIG. 2. is a diagram of a printer, according to an example embodiment.

FIG. 2. is a diagram of a printer 200, according to an example embodiment. The printer 200 can also take up other configurations and include additional components not shown in the FIG. 2. The printer 200 is configured to provide automatic print failure detection and print correction.

The printer 200 includes a first print head 210A and a capture device 220A. In some embodiments, the printer 200 also includes a second print head 210B, a second capture device 220B, and a repositioning mechanism 230. Each of these will now be discussed in turn.

The first print head 210A is configured to produce a version of an image 201 on a first side 202 of print media 203. Again, the image 201 is unique information that is being imaged on the first side 202 of the print media 203. This unique information can include such things as, but not limited to, a bar code, a serial number, a pass code, a unique picture, a unique design, and the like. The unique information identifies a transaction of a consumer with an enterprise.

According to an embodiment, the printer 200 is a thermal printer, an inject printer, a laser printer, or an impact printer. The printer 200 is modified in the manner discussed herein to provide novel print failure detections and in some instances automatic corrections.

The capture device 220A is situated and integrated within the printer 200 so as to electronically capture and record the version of the image 201 as the image 201 appears on the first side 202 of the media 203. That is, the capture device 220A is configured within and situated within the printer 200 to obtain an electronic version of the image 201 from the first side 202 of the media 203.

The capture device 220A is also configured to verify that a quality level of the version of the image 201 is within a predefined tolerance.

It is noted that the version of the image 201 is electronically captured and verified against the predefined tolerance before the media 203 is dispensed from the printer 200 with the version of the image 201 appearing on the first side 202 of the media 203. In other words, the media 203 is not re-fed back through the printer to encounter the capture device 220A by the consumer of the print media 203. The image 201 and verification of the image 201 by the capture device 220A occur without user/consumer direction.

In an embodiment, the capture device 220A is a barcode reader/scanner integrated into the printer 200.

In another scenario, the capture device 220A is a camera integrated into the printer 200.

According to one configuration, the printer 200 also includes a second print head 210B situated to interface with the media 203 on a second side 204 of the media 203. The second print head 2108 is configured to produce another copy 205 of the image 201 on the second side 204 of the media 203.

Depending on parameters associated with the print job that the printer 200 is processing to produce the image 201, (1) the printer 200 can be configured to automatically print the image 201 on the first side 202 of the media 203 using the first print head 210A and print the copy 205 on the second side 204 of the media 203; or (2) the printer 200 may just print the copy 205 on the second side 204 of the media 203 when verification of image 201 fails to be within the predefined tolerance value.

So, in one case, the printer 200 may include a repositioning mechanism 230 configured to reposition the capture device 220A and/or reposition the media 203 within the printer to allow the capture device 220A to capture and record the copy 205 of the image 201, which is obtained from the second and opposite side 204 of the media 203. The capture device 220A also configured to verify that a second quality level for the copy 205 is within the predefined tolerance value or range of values. Thus, the copy 205 can be verified for quality as well by either flipping the media 203 within the printer 200 via the repositioning mechanism 230 to expose the copy 205 to the capture device 220A or by moving the capture device 220A within the printer via the repositioning mechanism 230 to read/scan the copy 205 from the second side 204.

Another configuration of the printer 200 can occur as well as an alternative to the last embodiment discussed. For example, the printer 200 can include a second capture device 220B that is situated on the second side 204 of the media 203 and the media 203 passes through the printer 200. The second capture device 220B then captures and records the copy 205 and compares a second quality level for the copy 205 against the predefined threshold value or range of values.

In some situations, the second print head 210B is only activated when the first capture device 220A fails to verify the image 201 on the first side 202 of the media.

In other cases, the second print head 2108 is activated regardless of the verification, such that the media 203 will always include the image 201 and the copy 205 on both the first side 202 and the second side 204.

According to an embodiment, the capture device 220A is configured to communicate results associated with verifying the quality level over a network connection to a predefined resource. In some cases, the results identify image attributes captured from the image 201 as the image 201 appears on the first side 202 of the media.

In an embodiment, the predefined resource is an email account of an administrator, a phone having a phone number of the administrator to which a text message is sent, a log database, and/or a website monitored by the administrator.

It is noted that the quality level can be any value or set of values configured within and accessible to the capture device 220A. These values can identify and/or provide a value for such things as print density, element drop-outs, white areas, coloring, patterns, ability to read a provided barcode, broken lines, unbroken lines, and the like. The quality level is computed based on inspection of image attributes for the image 201 as it appears on the first side 202 of the media 203. The predefined tolerance can be a single value, a range of values, or a set of values that is compared to values obtained from the image 201, which represent the quality level, and a determination is made as to whether the image 201 is acceptable or unacceptable. So, comparing the captured image 201 from the first side 202 of the media 203 against the predefined tolerance is configured into the processing of the capture device 220A by extracting values for attributes of the image 201 and comparing those values against the predefined threshold.

Figure 3:
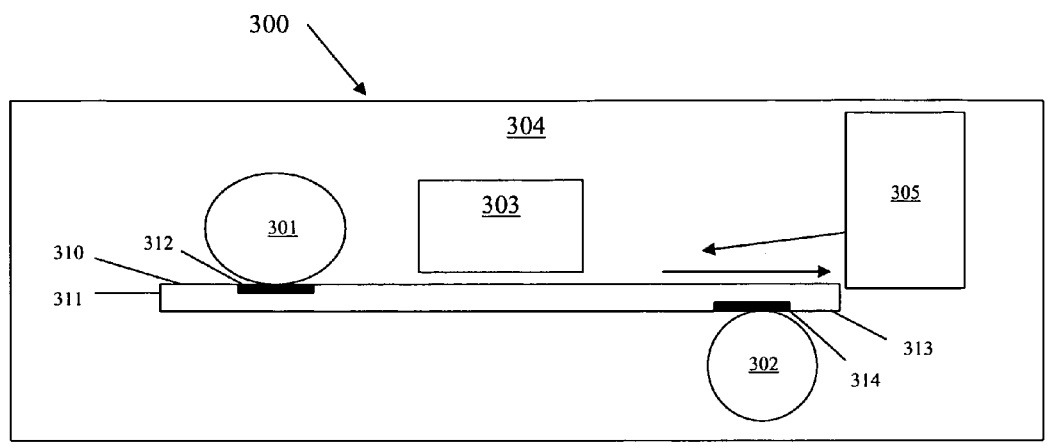
FIG. 3 is a diagram of another printer, according to an example embodiment.

FIG. 3 is a diagram of another printer 300, according to an example embodiment. The printer 300 can also take up other configurations and include additional components not shown in the FIG. 3. The printer 300 is configured to provide automatic print failure detection and print correction. In some cases, the printer 300 is an enhanced version or different perspective of the printer 200 discussed above with reference to the FIG. 2.

The printer 300 includes a first print head 301, a second print head 302, a scanner 303, and an image validation processor 304. In some cases, the printer 300 also includes a media repositioning mechanism 305. Each of these and their interactions with one another will now be discussed in turn.

The first print head 301 is configured to interface with a first side 310 of print media 311 as that print media 311 passes through the printer 300. The first print head 301 is configured to produce a first version of an image 312 on the first side 310 of the media 311 as the media 311 passes through the printer 300.

The second print head 302 is configured to interface with a second side 313 of the print media 311 as the print media 311 passes through the printer 300. The second print head 302 is configure to produce a second version of the image 314 on the second side 313 of the media 311 as the media 311 passes through the printer 300.

The scanner 303 is configured to attempt to read the first version of the image 312 and pass results of the attempted read to the image validation processor 304.

According to an embodiment, the scanner 303 is a bar code reader. In another case, the scanner 303 is a digital camera having processing capabilities to also read bar codes and other aspects of digital images.

The image validation processor 304 is configured to compare the results with a threshold value to determine whether the first print head 301 has failed or is in a condition in which failure of the first print head 301 is probable on future prints to the media 311.

The threshold value can be a single value, a set of values that map for comparison purposes to different image attribute values gleaned from the first version of the image 312 by the scanner 303, and/or a range of values. Examples of the types of attributes and values were presented above with reference to the printer 200 of the FIG. 2.

In an embodiment, the image validation processor 304 is configured to report any failed comparison to a predefined resource over a network connection, such as over an Internet connection. This facilitates proactive maintenance of the printer 300 and ensures that the printer 300 is operational more frequently. It is noted that should the first print head 301 fail or start to fail, the second version of the image 314 is still available to a consumer on the second side 313 of the media 311. So, the printer 300 remains operational while a service call goes out to fix the first print head 301 and that service call can be automatically generated by the image validation processor 304.

According to an embodiment, the printer 300 also includes a media repositioning mechanism 305. The media repositioning mechanism 305 is configured to reposition the second side 313 of the media 311 so that the second side 313 is exposed to the scanner 303 for the second version of the image 314 to be validated by the image validation processor 304 when the results do not meet the threshold value. In other words, the repositioning mechanism 305 moves the second side 313 of the media 311 having the second version of the image 314 to the scanner 303 to capture an electronic copy of that second version of the image 314 and supplies that to the image validation processor 304 for validation when the first version of the image 312 is defective. This provides two checks of the image to make sure at least one of the print heads 301 or 302 is functioning properly for a consumer.

In some cases, the printer 300 is: a dual-sided thermal printer, a dual-sided laser printer, a dual-sided inkjet printer, or a dual-sided impact printer.

The printer 300 may also be part of or integrated into a standalone consumer kiosk.

Figure 4:
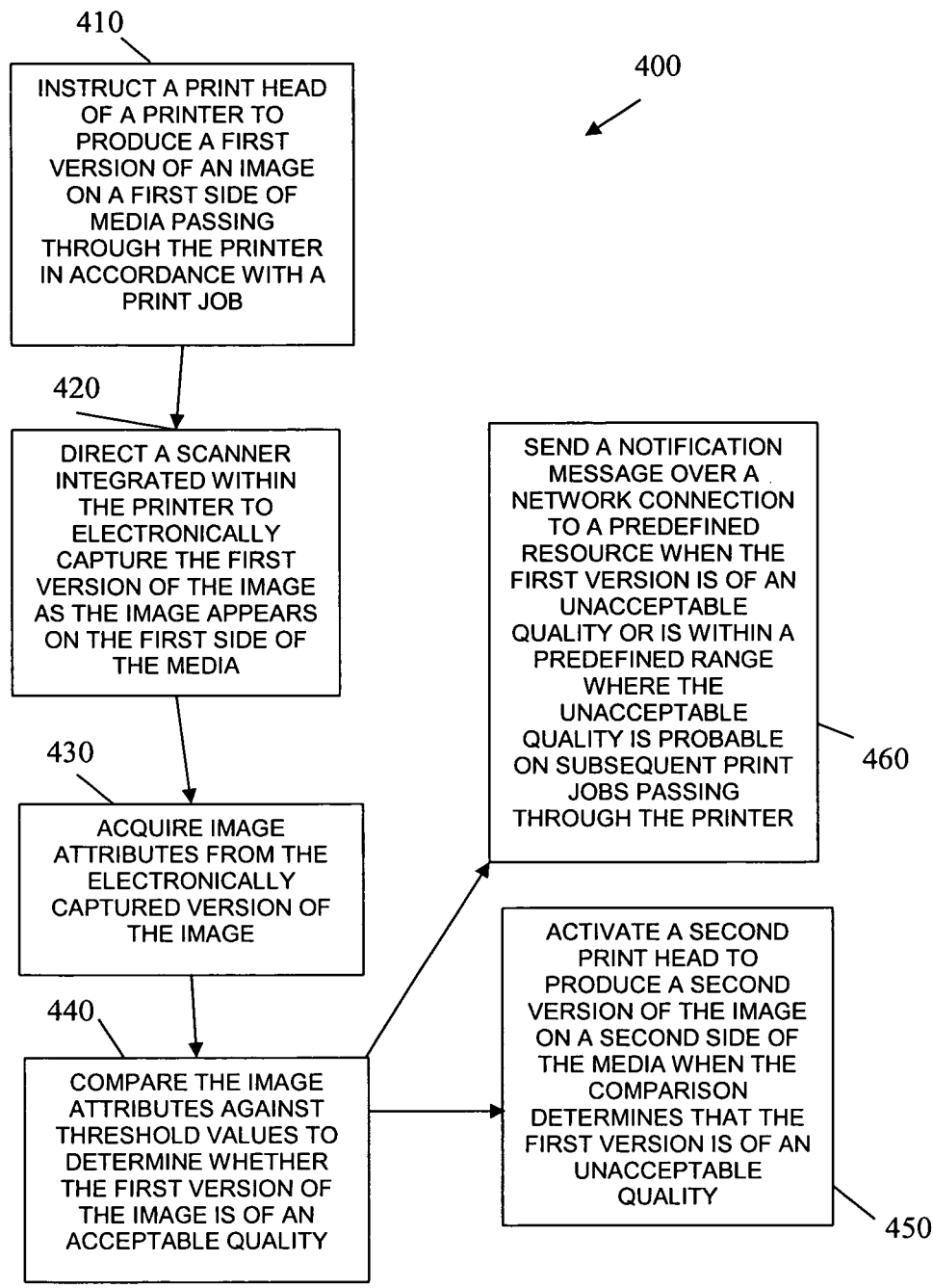
FIG. 4 is a diagram of a method for detecting print job failures, according to an example embodiment.

FIG. 4 is a diagram of a method 400 for detecting print job failures, according to an example embodiment. The method 400 (hereinafter referred to as "print service") is implemented in and programmed within a non-transitory processor-readable storage medium and is executed by one or more processors embedded within a printer. The printers 200 and 300 of the FIGS. 2 and 3 are capable of processing the print service.

At 410, the print service instructs a print head of a printer to produce a first version of an image on a first side of media passing through the printer in accordance with a print job. The image is some uniquely identifying information that uniquely identifies a transaction of a consumer with an enterprise, such as a bar code, a unique pattern, a pass code, and the like.

At 420, the print service directs a scanner that is integrated within the printer to electronically capture the first version of the image as the image appears on the first side of the media. So, the scanner acquires an electronic version of the image from the media after the image is produced on the media.

At 430, the print service acquires image attributes from the electronically captured version of the image. Examples of the types of image attributes and values were provided above with reference to the FIGS. 2 and 3.

At 440, the print service compares the image attributes against threshold values to determine whether the first version of the image is of an acceptable quality. Again, what is "acceptable" can be defined via threshold values that are compared against the image attributes acquired from the image as it appears on the media. This was discussed at length above with reference to the FIGS. 2 and 3.

According to an embodiment, at 450, the print service activates a second print head to produce a second version of the image on a second side of the media when the comparison determines that the first version is of an unacceptable quality. So, the image is reproduced on the opposite side of the media when the original produced image on the first side fails to meet a predefined quality level.

In another situation, at 460, the print service sends a notification message over a network connection to a predefined resource when the first version is of an unacceptable quality or is within a predefined range where the unacceptable quality is probable or subsequent print jobs passing through the printer. In other words, when image attribute values are approaching a threshold and appear within a predefined range, the print service can decide that unacceptable quality is probable with future print jobs and can remotely request service to replace the first print head in advance of its failure.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A printer, comprising:
    a print head configured to produce a version of an image on a first side of media; and
    a capture device situated within the printer to electronically capture and record the version of the image obtained from the first side of the media while the media is being processed by the printer and configured to verify that a quality level of the version is within a predefined tolerance, the version is electronically captured and verified before the media is dispensed from the printer with the version of the image on the first side of the media and the media is being processed by the printer without being re-fed into the printer, and when the version is not within the predefined tolerance a copy of the image is produced on a second side of the media before the media is dispensed from the printer and the produced copy based on the predefined tolerance of the version of the image produced on the first side of the media, processing to compare the version against the predefined tolerance is configured within the capture device, and the predefined tolerance is a range of values representing a particular quality level that is a set of values for print density, element drop-outs, white areas, coloring, patterns, ability to read a barcode, broken lines, and unbroken lines.

2. The printer of claim 1, wherein the printer is one of: a thermal printer, an inkjet printer, a laser printer, and an impact printer.

3. The printer of claim 1, wherein the capture device is a barcode reader integrated into the printer.

4. The printer of claim 1, wherein the capture device is a camera integrated into the printer.

5. The printer of claim 1 further comprising: a second print head configured to produce the copy of the image on the second and opposite side of the media.

6. The printer of claim 5 further comprising: a repositioning mechanism configured to reposition the capture device and/or to reposition the media within the printer to allow the capture device to capture and record the copy of the image obtained from the second and opposite side of the media, the capture device configured to verify that a second quality level for the copy is within the predefined tolerance.

7. The printer of claim 5 further comprising: a second capture device configure to capture and record the copy obtained from the second and opposite side of the media, the second capture device configured to verify that a second quality level for the copy is within the predefined tolerance.

8. The printer of claim 5, wherein the second print head is configured to be activated when the capture device fails to verify the quality level to be within the predefined tolerance.

9. The printer of claim 5, wherein the second print head is configured to be activated regardless of results associated with verifying the quality level to the predefined tolerance.

10. The printer of claim 1, wherein the capture device is configured to communicate results associated with verifying the quality level over a network connection to a predefined resource.

11. The printer of claim 10, wherein the predefined resource is one or more of: an email account of an administrator, a text message to a predefined phone number of the administrator, a log database, and/or a website monitored by the administrator.

12. The printer of claim 10, wherein the results identify image attributes captured from the image as the image appears on the first side of the media.

13. A printer, comprising:
a first print head;
a second print head;
a scanner; and
an image validation processor, the first print head configured to produce a first version of an image on a first side of media passing through the printer, and the second print head configured to produce a second version of the image on a second side of the media as the media passes through the printer based on a quality resolved for the first version of the image produced on the first side of the media and without the media being re-fed to the printer, and the scanner configured to attempt to read the first version of the image and pass results of the attempted read to the image validation processor, the image validation processor configured to compare the results with a threshold value to determine whether the first print head is in a condition in which failure of the first print head is probable on future prints to other media, the image validation processor configured into the scanner, and the threshold value representing a set of values that map for comparison purposes to different image attribute values gleaned from the first version of the image by the scanner.

14. The printer of claim 13, wherein the printer is a dual-sided thermal printer, a dual-sided laser printer, a dual-sided inkjet printer, or a dual-sided impact printer.

15. The printer of claim 13, wherein the printer is a standalone consumer kiosk.

16. The printer of claim 13 further comprising, a media repositioning mechanism
configured to reposition the second side of the media to be exposed to the scanner for the second version of the image to be validated by the image validation processor when the results do not meet the threshold value.

17. The printer of claim 13, wherein the image validation processor is configured to report any failed comparison to a predefined resource over a network connection.

18. A processor-implemented method programmed in a non-transitory computer-readable medium and executed by a processor embedded in a printer, comprising:
instructing a print head of a printer to produce a first version of an image on a first side of media passing through the printer in accordance with a print job;
directing a scanner integrated within the printer to electronically capture the first version of the image as the image appears on the first side of the media without re-feeding the media to the printer;
acquiring image attributes from the electronically captured version of the image; and
comparing the image attributes against threshold values to determine whether the first version of the image is of an acceptable quality and when the first version of the image is not of the acceptable quality automatically producing a second version of the image on a second side of the media before the media is dispensed from the printer and without re-feeding the media to the printer, and the produced second version based on the predefined tolerance of the first version of the image produced on the first side of the media, the comparing configured within the scanner, and the threshold values representing a particular quality level that is a set of values for print density, element drop-outs, whiter areas, coloring, patterns, ability to read a barcode, broken lines, and unbroken lines.

19. The method of claim 18 further comprising, activating a second print head to produce the second version of the image on the second side of the media when the comparison determines that the first version is of an unacceptable quality.

20. The method of claim 18 further comprising, sending a notification message over a network connection to a predefined resource when the first version is of an unacceptable quality or is within a predefined range where the unacceptable quality is probable on subsequent print jobs passing through the printer.

* * * * *